United States Patent
Pedyash et al.

(10) Patent No.: US 7,046,166 B2
(45) Date of Patent: May 16, 2006

(54) MODULAR WIRELESS INTEGRATED NETWORK SENSOR (WINS) NODE WITH A DUAL BUS ARCHITECTURE

(75) Inventors: Maxim Pedyash, Simi Valley, CA (US); Victor Panov, Newbury Park, CA (US); Nikolai Romanov, Agoura Hills, CA (US); Dustin McIntire, Ventura, CA (US); Gary Gould, Oxnard, CA (US); Loren Clare, Thousand Oaks, CA (US); Jonathan Agre, Brinklow, MD (US); Allen Twarowski, Thousand Oaks, CA (US); James Duncan, Thousand Oaks, CA (US)

(73) Assignee: Rockwell Scientific Licensing, LLC, Thousand Oaks, CA (US)

( * ) Notice: Subject to any disclaimer, the term of this patent is extended or adjusted under 35 U.S.C. 154(b) by 505 days.

(21) Appl. No.: 10/426,407

(22) Filed: Apr. 29, 2003
(Under 37 CFR 1.47)

(65) Prior Publication Data

US 2004/0217881 A1     Nov. 4, 2004

(51) Int. Cl.
*G08C 19/22* (2006.01)
*H04Q 9/00* (2006.01)

(52) U.S. Cl. .................. 340/870.07; 340/870.01; 340/870.08; 701/13

(58) Field of Classification Search .......... 340/870.07, 340/690, 539.1, 870.16, 870.01, 870.08; 702/16, 14; 73/577, 286; 701/13
See application file for complete search history.

(56) References Cited

U.S. PATENT DOCUMENTS

| | | | |
|---|---|---|---|
| 5,854,994 A * | 12/1998 | Canada et al. ................. | 702/56 |
| 5,861,738 A * | 1/1999 | Becker-Irvin et al. ...... | 323/282 |
| 5,919,256 A * | 7/1999 | Widigen et al. ............ | 712/218 |
| 5,946,631 A | 8/1999 | Melnik | |
| 5,953,668 A | 9/1999 | Reilly | |
| 6,028,857 A | 2/2000 | Poor | |
| 6,046,978 A | 4/2000 | Melnik | |
| 6,122,565 A | 9/2000 | Wenning et al. | |
| 6,178,141 B1 | 1/2001 | Duckworth et al. | |
| 6,208,247 B1 | 3/2001 | Agre et al. | |
| 6,947,722 B1 * | 9/2005 | Kim et al. .................. | 455/349 |
| 2003/0154262 A1 * | 8/2003 | Kaiser et al. ................ | 709/219 |

* cited by examiner

*Primary Examiner*—Timothy Edwards, Jr.
*Assistant Examiner*—Sisay Yacob
(74) *Attorney, Agent, or Firm*—John J. Deinken; Eric Gifford; David J. Zoetewey (57) ABSTRACT

A modular sensing station architecture that supports flexible power management includes one or more sensors connected to a WINS node. Each node includes power supply, data acquisition, programmable microprocessor and wireless transceiver modules that communicate data and instructions over a bus. The bus suitably includes a signal bus for communicating instructions and low bandwidth data and a high-capacity data bus for transferring high bandwidth data and executing high power tasks. The dual bus approach provides constant communications among the modules and low-capacity data transfer with the option to activate the high-power circuits or tasks only as needed.

25 Claims, 9 Drawing Sheets

MODULAR WIRELESS INTEGRATED NETWORK SENSOR (WINS) NODE WITH A DUAL BUS ARCHITECTURE

BACKGROUND OF THE INVENTION

1. Field of the Invention

This invention relates to wireless sensing station for use in a wireless network for monitoring sensed physical conditions and more specifically to a modular, low-power architecture for a Wireless Integrated Network Sensor (WINS) Node.

2. Description of the Related Art

Sensor networks have numerous applications, such as security, industrial monitoring, military reconnaissance and biomedical monitoring. In many such applications it is either inconvenient or impossible to connect the sensors by wire or cable; a wireless network is preferable.

Wireless networks of sensor stations, however, present several technical challenges. Wireless communication generally requires higher power than wired communication over the same distance; but an individual wireless sensor station requires a limited, self-contained power supply, which usually dictates that it conserve energy. The resulting low power constraint severely limits the range of wireless transmission by an individual sensor station. If control or data processing occurs at a central location, then the entire network is vulnerable to failure of the central processor. For both power conservation and robustness, each sensor station should locally process the sensor data and make local decisions to reduce the amount of data transmitted and to distribute decision making.

U.S. Pat. No. 5,854,994 describes a wireless system for monitoring the health of a plurality of machines, such as in a manufacturing plant, consisting of a plurality of machine monitors mounted on a plurality of machine measuring points. Each machine monitor includes at least one sensor to sense a characteristic of the machine at the machine measuring point and generate at least one sensor signal. Each machine monitor also includes a data processor for receiving and analyzing the sensor signals, for producing analyzed signals based on the sensor signals, and for producing selected data based on the analyzed sensor signals. Each machine monitor contains a transmitter, which produces wireless transmission signals corresponding to the sensor signals, and a receiver. The apparatus also includes a command station with a receiver for receiving the transmission signals from the machine monitors and a transmitter for issuing commands to the machine monitors. The command station stores data corresponding to the received signals, which are representative of the sensed characteristic of the machine. To conserve power, a time in the machine monitor energizes and de-energizes the sensor, data processor, and transmitter at selected times.

The shortcomings of the '994 machine monitoring system are a hard-wired architecture that is not scalable and power cycling that is on a fixed schedule between on and off modes of operation.

U.S. Pat. No. 6,208,247 describes a sensing station that when deployed in a network allows monitoring of the spatial extent and distribution of a sensed condition that overcomes many of these limitations. The sensing is a miniature electronic sensing station, adaptable for two-way wireless communication in a network with other similar sensing devices, for sensing events such as an intrusion, vehicle movement, a change in status of some industrial process, or any physical change that can be detected by the sensors. As shown in FIG. 3 of the '247 patent, each sensing station includes one or more sensors connected to a WINS node. Each node includes a digital signal processor for analyzing the data from the sensors; a programmable microprocessor for making decisions based upon the analyzed data, and for controlling communication functions; a power supply; and a wireless transceiver that communicates using a synchronous multi-access such as Time Division Multiple Access (TDMA), code division multiple access (CDMA) or frequency division multiple access (FDMA), for communicating with other nodes in the network and with users all enclosed in a single package. The DSP is hard-wired to the microprocessor, which in turn is hard-wired to the wireless transceiver to optimize performance and cost of a particular design. Circuits which are not required to be active during a time window are held in an inactive "sleep mode" so as to conserve power.

The shortcomings of the '247 WINS node are that its hard-wired architecture is not modular hence not scaleable and is not flexible enough for optimum power management.

SUMMARY OF THE INVENTION

In view of the above problems, the present invention provides a modular architecture for a sensing station that supports flexible power management.

Each sensing station includes one or more sensors connected to a WINS node. Each node includes a power supply module; data acquisition module that produces a digital output based upon the sensor condition; a CPU module for processing the sensor's digital output and generally controlling node operations; a wireless transceiver module that is controlled by said CPU module to receive data and instructions and to transmit information about the sensed condition; and a bus for communicating data and instructions between the data acquisition, CPU, wireless transceiver modules.

The bus suitably includes a signal bus for communicating instructions and low bandwidth data and a high-capacity data bus for communicating instructions and high bandwidth data and executing high power tasks. The dual bus approach provides constant communications among the modules and low-capacity data transfer with the option to activate the high-power circuits or tasks only as needed. In one embodiment, the bus includes a power bus that distributes a single voltage reference from the power supply module for driving each of the modules.

These and other features and advantages of the invention will be apparent to those skilled in the art from the following detailed description of preferred embodiments, taken together with the accompanying drawings, in which:

DETAILED DESCRIPTION OF THE INVENTION

The present invention provides a modular architecture for a WINS node that supports flexible power management. Unlike the hard-wired '247 WINS node, which was designed to improve performance and reduce the cost of an individual node, the current modular architecture is designed to (a) optimize performance and cost of deploying a network of WINS nodes for a customer's particular application and (b) provide the manufacturer with the ability to easily and cost-effectively reconfigure the node(s) for different customers needs. Furthermore, the current WINS node architecture provides enhanced power management flexibility, which extends node lifetime without sacrificing node and network performance. These benefits are achieved by using a dual data/control bus and, in a preferred embodiment, a single power bus to support the data acquisition, microprocessor, transceiver and other auxiliary modules. The additional cost and complexity of maintaining a dual bus is more than offset by the scalability and power management attributes it supports.

Figure 1:
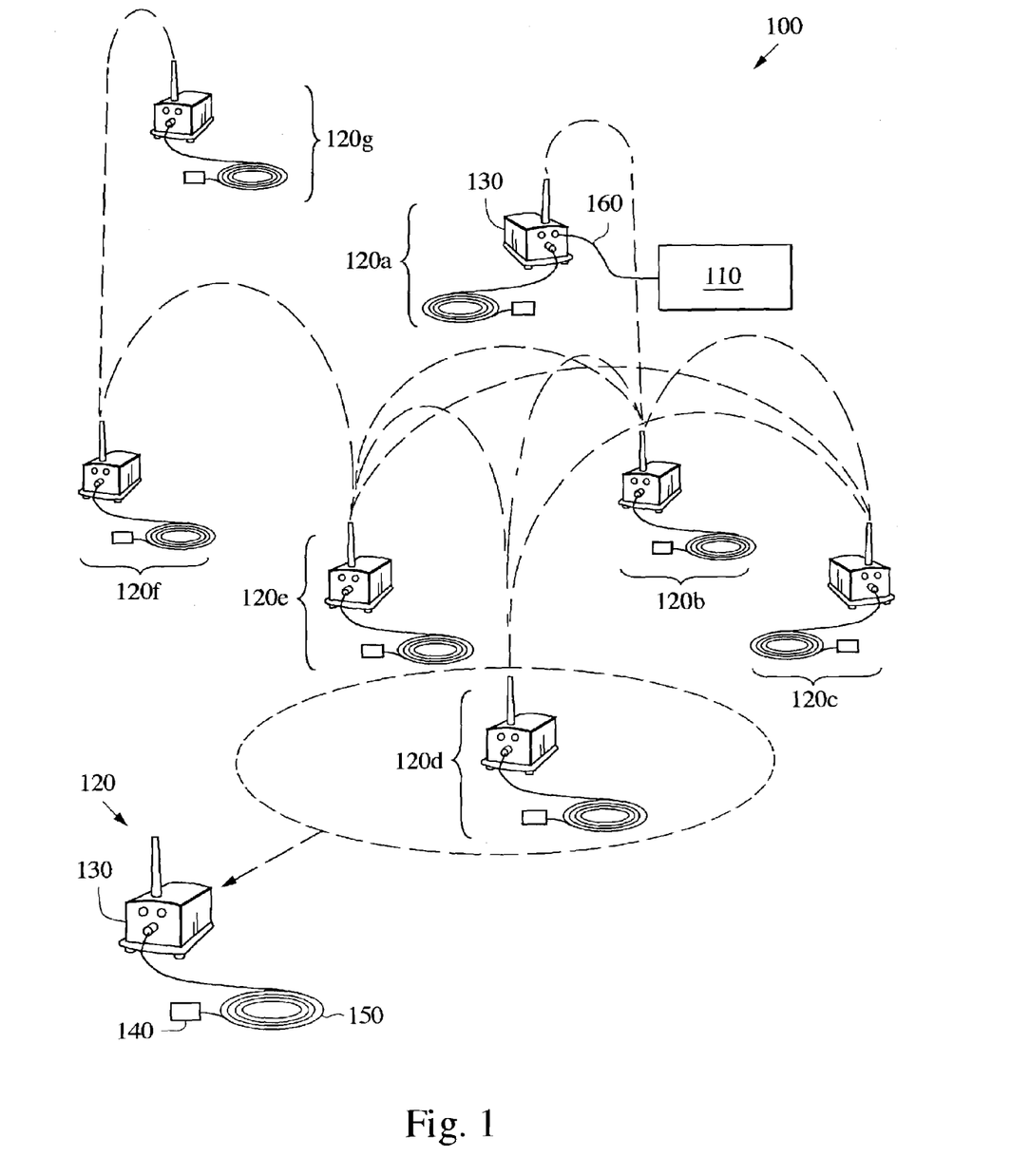
FIG. 1 is a diagram of a wireless sensor network comprising a number of sensing stations.

FIG. 1 illustrates a wireless network system 100, in accordance with the invention. Wireless network system 100 includes a computer module 110 and a plurality of sensing stations 120 (i.e., sensing stations 120a, 120b, 120c, 120d, 120e, 120f, and 120g). Each sensing station 120 further includes a wireless node 130 electrically connected to a sensor 140 via a cable 150, which is suitably a low noise shielded multi-wire cable. As will be described in detail later, the modular architecture of the wireless node facilitates the design and deployment of sensing stations that are configured for a particular application. The sensing stations for a given application may be identical or may having varying sensor, computational and transceiver capabilities. In addition, each node has enhanced capability to manage its power budget thus extending the functionality and lifetime of an individual node and the network.

Computer module 110 is any conventional PC, programmable logic controller (PLC), wireline network, or mainframe computer. Computer module 110 acts as the end user interface to the network and is loaded with the necessary software for controlling wireless network system 100. The real time operating system allows for prioritization of tasks in response to a real time set of events whose occurrence is often unpredictable, allows for easy expansion and contraction of an existing network of sensors, and provides control of distributed processes. Since the real time operating system controlling wireless network system 100 allows processing and analysis to occur at the source (i.e., at each sensing station 120), data transfer to computer module 110 and ultimately to the end user is minimized.

Wireless node 130 generally includes a data acquisition module for acquiring data from one or more sensors 140, a CPU module for making decisions based upon the analyzed data and for controlling communication functions, a power supply module, and a radio frequency transceiver module for communicating with other sensing stations 120 within wireless network system 100 and with users. Each of the modules is connected to a bus that communicates commands and data between the modules. The bus architecture supports a modular design and distributed processing and control among the modules. The node to be reconfigured during design or in the field by simply replacing or adding new modules connected to the bus.

The bus suitably includes a signal bus for communicating instructions and low bandwidth data and a high-capacity bus for communicating instructions and high bandwidth data and executing high power tasks. The dual bus approach provides constant communications among the modules and low-capacity data transfer with the option to activate the high-power circuits or tasks only as needed. In one embodiment, the bus includes a power bus that provides a single voltage reference for driving each of the modules. All of the components of wireless node 130 are enclosed in a single package and collectively constitute a "node" of the network. Specific details and description of wireless node 130 are discussed in FIGS. 2 through 12.

The nodes and the modules within a node communicate with each other using standard or customized protocols. The nodes send and receive information using a multihop method, relaying messages through a series of short, low power RF transmissions or "hops" rather than by long, high power jumps. At the channel access layer, one approach is Carrier Sense Multiple Access (CSMA) in which a node listens to network traffic and when the network is not busy that node sends its signals. The advantage of this approach is that bandwidth is used on an on demand basis. The disadvantage is that a node or nodes may be denied access for extended periods of time. The approach used in the '247 WINS node and preferred herein is a Time Division Multiple Access (TDMA) scheme. TDMA is preferred because it allows transceivers to remain in a power conserving, off state for periods of time when not in use, turning on only for short bursts. Because each node has a very short range, multiple nodes may use the same channel simultaneously so long as the simultaneous users are out of range of one another.

The data including raw sensor data, processed data, commands, instructions, code, etc. is passed back-and-forth in a well-defined packet structure. A packet includes a header, which provides routing information and priority, and a data section that includes the data. A standard packet structure such as TCP/IP may be used. Sensor 140 provides detection and analysis of a physical condition to be monitored over a certain area. Such physical conditions include vibration, infrared radiation, sound, temperature, and pressure. Consequently, sensor 140 is any number of various sensing devices, such as an accelerometer for vibration measurements, a differential pressure sensor, a temperature sensor, a magnetometer, an acoustic sensor, or combinations of sensor functions. Specific examples of sensors include an LM60 temperature sensor manufactured by National Semiconductor, or a 55L, 55M7, or 55M8, which are combination temperature sensors and piezoelectric accelerometers manufactured by Endevco.

Computer module 110 is electrically connected to and is in communication with sensing station 120a via a serial port cable 160 to its wireless node 130. Cable 160 is suitably a standard network connection cable and its physical composition depends on the wired network to which it is connected. This sensing station 120a is called the "base node" because it has the only wireless node 130 in the system with a direct electrical connection to a wired subsystem, such as module 110. Additionally, the "base" or "gateway" node may or may not have sensor 140 connected to its wireless node 130.

In a typical application, a network of nodes may contain a large number (more than 100) of sensing stations 120. Sensing stations 120 are spaced closely together, the node-to-node distance is typically 100 yards or less. Sensing stations 120 are placed randomly (i.e., dropped from an aircraft or a ship) or are placed manually at specific locations. It is not necessary for each sensing station 120 to have a known location before startup; sensing stations 120 are programmable to organize themselves in a distributed network. Control of the network is also distributed among sensing stations 120: no indispensable sensing station 120 is necessary.

The ability to use two-way wireless communication enables wireless network system 100 to respond to changes in environment or changes in command priorities. Each wireless node 130 can be reprogrammed by wireless transmissions relayed through the network. For example, new spectral profiles can be entered, or wireless node 130 can be reprogrammed for a higher duty cycle during critical periods of activity. Loss of sensing stations 120 or the addition of new sensing stations 120 can be accommodated easily.

Modular Wins Node Architecture

Figure 2:
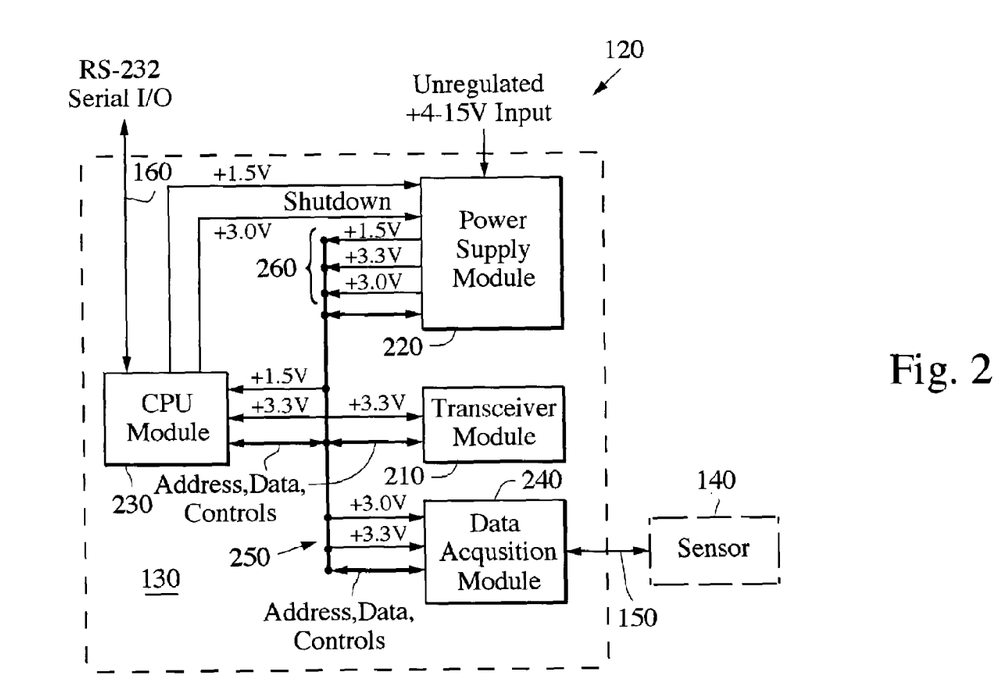
FIG. 2 is a block diagram of a WINS node using a common bus in accordance with the present invention.

FIG. 2 is a high-level block diagram of sensing station 120 using a bus 250 in accordance with the present invention to support the functional modules. As shown in FIG. 2, sensing station 120 includes wireless node 130 and sensor 140. Wireless node 130 further includes a transceiver module 210, a power supply module 220, a CPU module 230, and a data acquisition module 240. Additional modules such as a second processor, an Ethernet connector, etc. may be plugged into bus 250. Typically, when a new module is added, CPU module 230 downloads the appropriate drivers to the new module via the bus and reconfigures the node. In a plug & play system, the module includes necessary drivers.

Consistent with the modular architecture, each module is preferably formed on its own board. Transceiver module 210 is described in FIG. 7, power supply module 220 is described in FIGS. 8a and 8b, CPU module 230 is described in FIG. 9, and data acquisition module 240 is described in FIG. 10. The physical assembly of the boards in a stacked configuration is described in FIGS. 11a and 11b.

Figure 4:
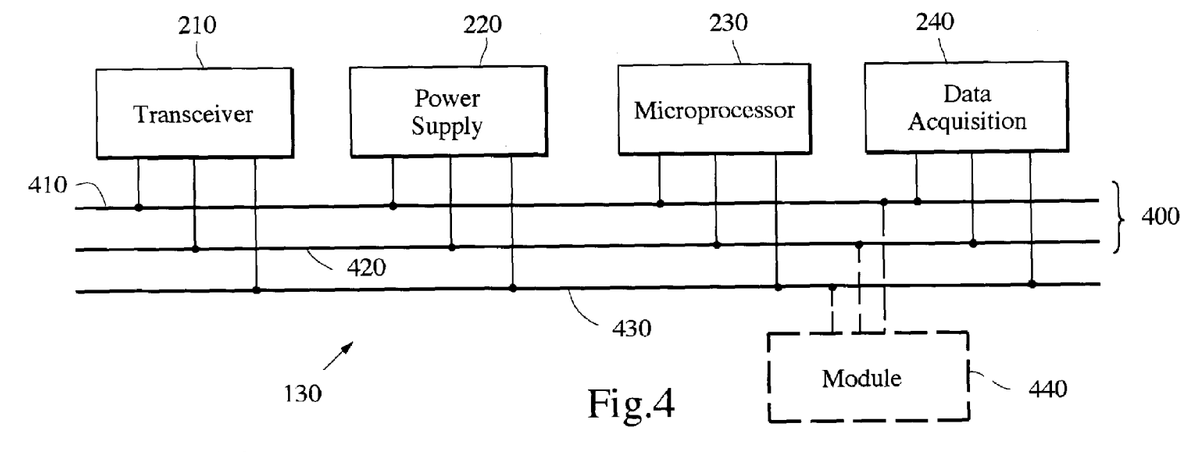
FIG. 4 is a block diagram of a WINS node using a dual bus in accordance with the present invention.
Figure 5:
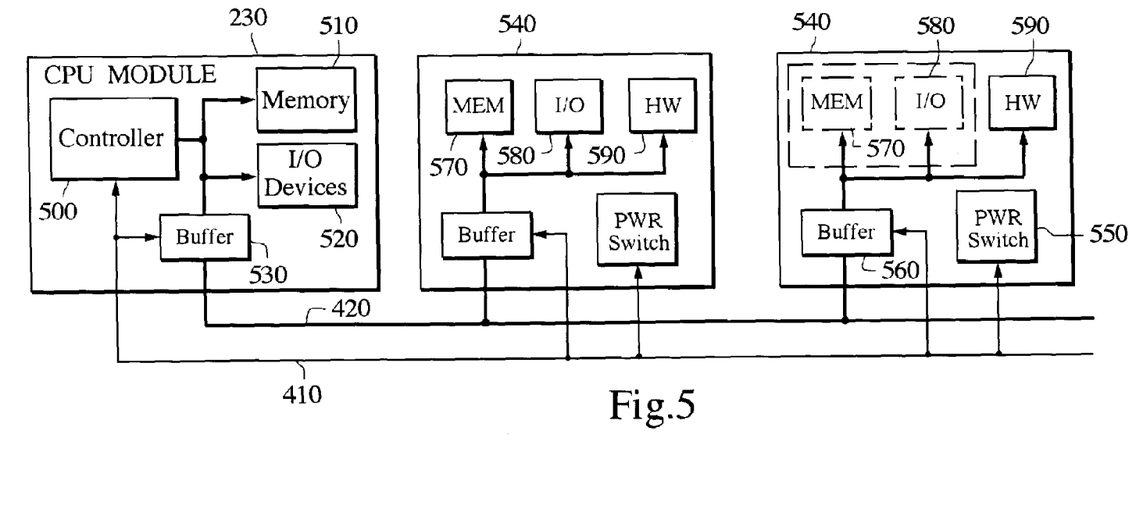
FIG. 5 is a more detailed block diagram of the dual bus modules shown in FIG. 4.
Figure 6:
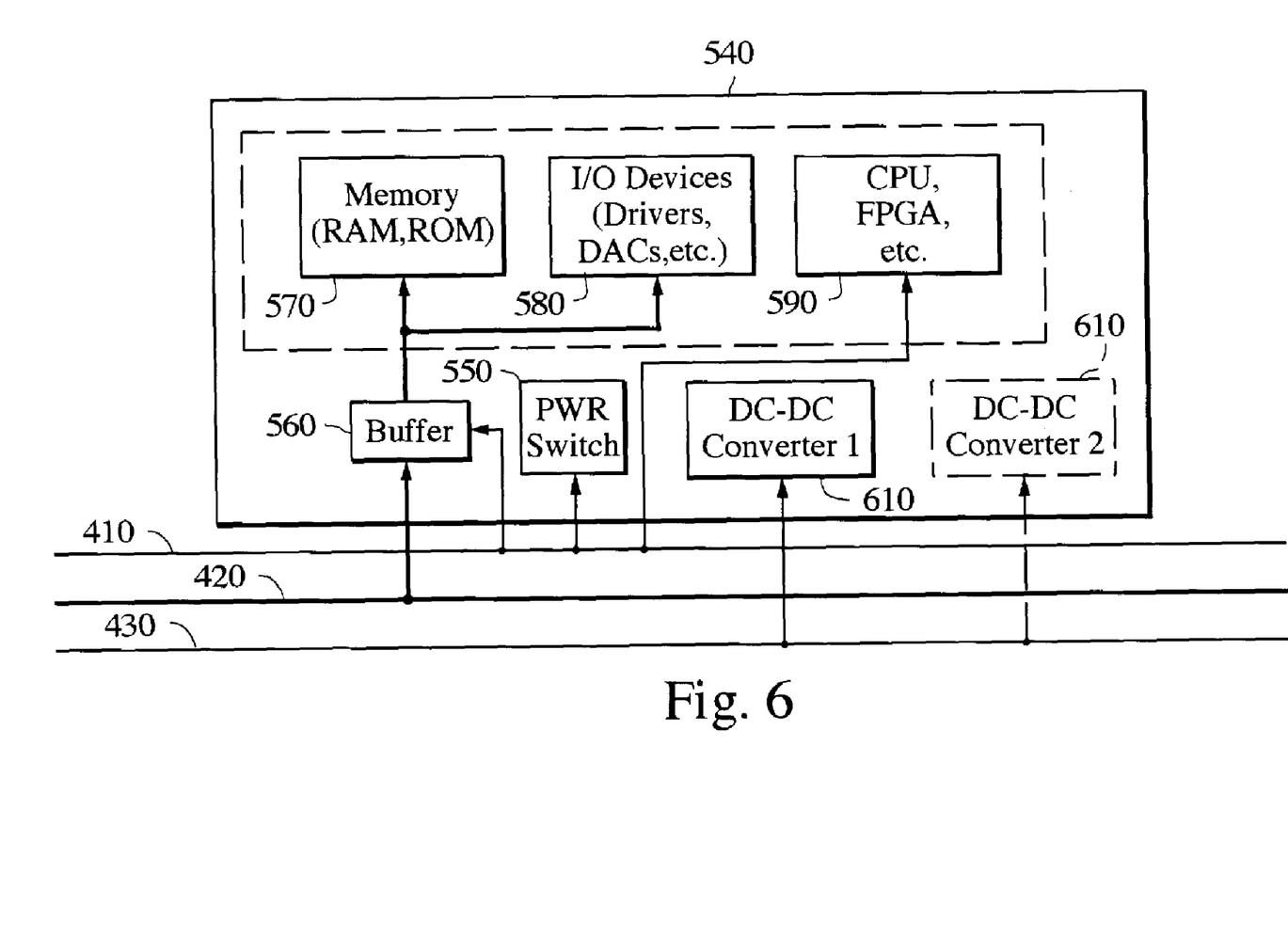
FIG. 6 is a block diagram of a generic module for use in a dual bus architecture.

Bus 250, suitably an 80-line bus that accommodates both analog and digital signals and preferably configured as a dual bus as described in FIGS. 4–6, that originates from CPU module 230 and distributes address, data, and control signals to transceiver module 210, power supply module 220, and data acquisition module 240, enables communication between boards. Bus 250 suitably includes address lines and control lines that communicate N-bit data between the modules. A typical bus to support the on-board memory would be 16+ address lines and 24 control lines that support 32 bit data. The control lines are typically software controllable lines that can be reassigned to control different modules. The bus is suitably common to all boards, thereby allowing any board within wireless node 130 to access hardware resources of other boards (memory, FPGAs, I/O registers), such as on transceiver module 210, data acquisition module 240, or CPU module 230, as described in FIGS. 7 and 9, respectively. As such, control functions can be initiated and controlled solely by the CPU module, requested by one module via the CPU module to another module or module-to-module, which expands processing flexibility and power management capability.

A bus approach allows the boards with the bus arbitration ("master") capability to generate memory or I/O access cycles to access RAM, flash, or registers of other modules. Either general-purpose IO signals (GPIOs) or dedicated ChipSelect CS lines can be used to select an appropriate "remote" hardware resource. The bus transaction is usually following by assertion of (or reading from) the corresponding address and data lines together with the assertion of ReadEnable RE or OutputEnable OE lines. Generally, any modern microcontroller (such as current WINS "main" CPU SA-1100) can act as a memory based bus arbiter. The bus approach allows a node to function in the absence of some of the system modules (for example, no data acquisition module is required for a relaying node). Additional modules can be added to the system at a later time.

Figure 8A:
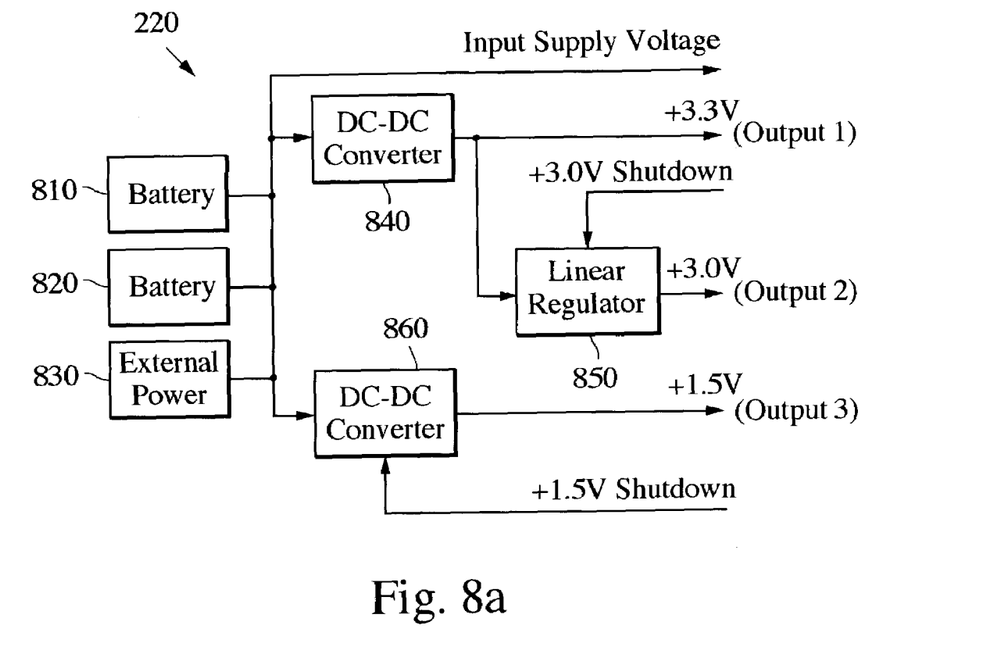
FIGS. 8a and 8b are block diagrams of a power supply module.
Figure 8B:
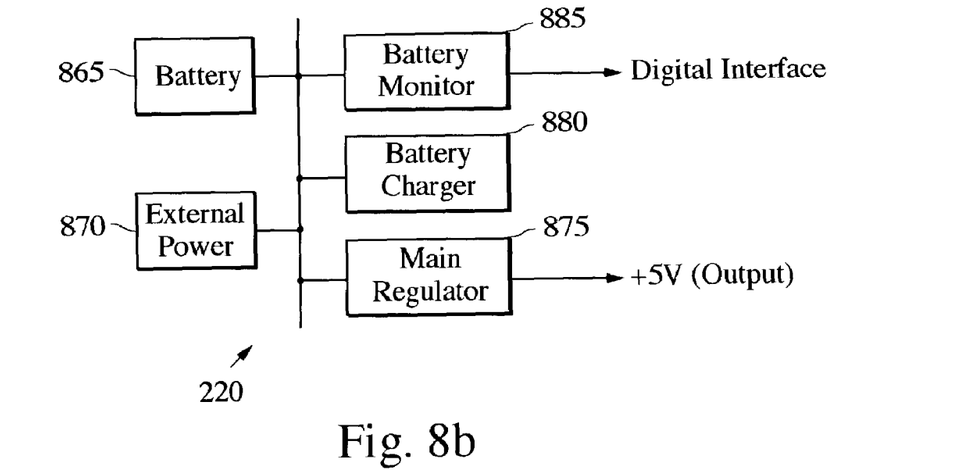

A power bus 260 distributes one or more reference voltages to the other modules. As shown in FIG. 8a, power supply module 220 supplies three different reference voltages to accommodate the requirements of the different modules. As shown in FIG. 8b, the power supply module 220 supplies a single reference voltage and each module is designed with a voltage transformer. The former approach may be cheaper at the component level but limits additional modules to run off one of the three voltages. The later approach increases the marginal cost of each component but is less expensive overall in configuring nodes/networks for many different applications.

Figure 3:
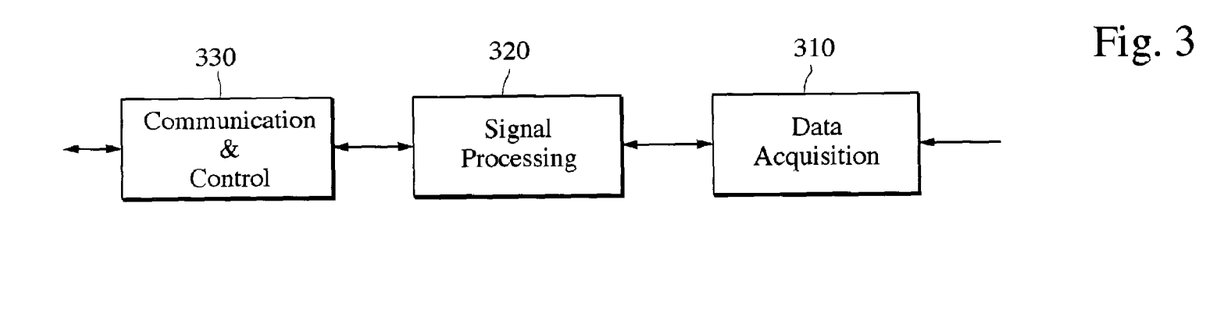
FIG. 3 is a block diagram illustrating data acquisition, signal processing and communication functions in the node.

FIG. 3 is a block diagram illustrating data acquisition, signal processing and communication & control functions in the node. These functions can be dedicated to a single module, shared by more than one module or distributed among multiple modules. For example, in the '247 node a DSP performs both data acquisition and low-level signal processing. Although this approach reduces component cost for a particular application it does not provide the flexibility of a modular architecture. In some cases the node may not require the DSP capabilities, which is a wasted cost and burden on the power budget. In other cases, the node may require additional DSP capabilities, which are not easily added to the hard-wired configuration. In the current invention, the functions are preferably split into distinct modules, which can be removed, added or replaced via the bus architecture to allow maximum flexibility when configuring new nodes or networks or when reconfiguring nodes and networks in the field.

In a typical embodiment of the invention, the sensors produce analog signal outputs. The data acquisition function 310 converts the sensor output to digital form for processing. A $\Sigma$-$\Delta$ ADC architecture is suitable as it provides low power and low noise operation. Although the low power constraint discourages the use of flash, pipelined, and sequential approximation architectures, any ADC architecture could be used provided that it has sufficient bandwidth and resolution for the sensor data of interest, and further provided that the ADC power consumption is not inconsistent with available power and power supply lifetime considerations.

Signal processing functions 320 include, for example, filtering and analyzing the digitized signal to improve signal-to-noise ratio and extract information regarding the amplitude and spectral characteristics of the sensor data. The amplitude and spectral characteristics of the signal are compared with spectral profiles (either stored or communicated from a network). High-level signal processing functions include, for example, taking the results of the comparison, the spectral data, and the raw signal data and combining them with data from other sensors, if multiple sensors are provided on the node, to extract clues as to the identity, number, size, distance and direction of the signal source (or sources).

Communications and control functions 330 include essential control, logic, and programming functions for the node including communication scheduling, topology learning for the network, maintenance and updating of routing tables, calculation of range relative to neighbor nodes or targets, storage of data, relaying of communications between nodes and to or from a user, and background network maintenance including power monitoring, self-diagnosis and handshaking.

As shown in FIG. 2, data acquisition module 240 performs the data acquisition functions and some of the signal processing in the FPGA and CPU module 210 performs both signal processing functions and the communications and control functions. In some applications it may be preferred to provide two (or more) modules to provide the signal processing and communications/control functions.

Dual Bus Architecture

The common bus architecture 250 shown in FIG. 2 supports a module and scaleable node configuration and can support the power conservation techniques discuss in the U.S. Pat. No. 6,208,247 patent. In short, a module can be turned off when not needed and turned back on when required. Although effective, this approach is limited in that when a module is off it is completely inactive, thus does not maintain even minimal control and communications with other modules. This may limit the functionality of a node or the entire network and may delay response to certain events. Furthermore, when the node is on, all of the power consuming components are on and data is transmitted at the "fully on" bit rate, thus consuming significant power.

FIG. 4 is a block diagram of a WINS node using a dual bus 400 in accordance with the present invention. The dual bus 400 suitably includes a signal bus 410 for communicating a limited instruction set and low bandwidth data and a high-capacity bus 420 for communicating a full instruction set and high bandwidth data and executing high power tasks. The dual bus approach provides continuous communications among the modules and low-capacity data transfer with the option to activate the high-power circuits or tasks only as needed. A power bus 430 distributes one or more voltage references from the power supply module for driving each of the modules.

Low power signal bus 410 can be used as an "always on" communication channel between modules, allowing modules to request attention by other modules, bring modules from sleep state (or request power up). Signal bus 410 can also be used to exchange low bandwidth control information between modules. For example, CPU Module can request a series of sensor readings from Data Acquisition Module, adjust Radio Module default transmit power, etc. High-capacity data bus 420 is usually used to move large chunks of data between modules. For example, retrieving acquired data from Data Acquisition Module, sending calibration or transformation tables to Data Acquisition Module, etc. A dual bus approach also allows a module to temporarily shut down power-hungry hardware elements (RAM, FPGAs, etc.) without affecting communication between other modules via shared memory bus. In addition it is easy to replace existing modules with new modules or to add modules 440 that expand node capability.

FIG. 5 is a more detailed block diagram of the dual bus, CPU and peripheral modules shown in FIG. 4. In this example, the signal bus 410 includes 4 address lines, 4 general-purpose control lines and supports 2-bit data. The high-capacity bus 420 includes 16 address lines, 24 control lines and supports 32-bit data. The CPU module 230 (shown in more detail in FIG. 9) includes a controller 500 that that communicates with signal bus 410 to send and receive control signals and low bit rate data and controls internal memory 510 and I/O devices 520. High bit rate data is read in and out of CPU module 230 via buffer 530. CPU controller 500 is typically a highly integrated microcontroller with power control functions implemented in the chip itself. Other peripheral modules 540 such as the transceiver and data acquisition or other pluggable modules include a power switch 550 that is in communication with signal bus 410 to put the module to sleep or wake it up. Data is communicated via buffer 560 that is connected to both the signal and data buses. Each module also includes memory 570 such RAM or ROM and I/O devices 580 such as drivers, DACS, etc. Specific modules may also include additional function specific hardware 590 as shown in detailed FIGS. 7–10. The buffers are primarily used to electrically decouple the modules' internal components, e.g. CPU, Memory, from the bus to prevent the bus signals corruption after a module power-down.

Currently modules have very little interaction with each other without CPU module acting as a "master" or "bus arbiter". However, the bus architecture supports other more distributed configurations. For example, multiple CPU modules could be used, a low power RISC-type CPU module that performs basic data processing and a power-hungry specialized digital signal processing (DSP) module that can be kept powered down most of the time. Alternately, the modules could be configured to handle some tasks without the CPU module. For example, a Data Acquisition module could sample a large amount of data and sends it directly to a Data Storage module without CPU module involvement. Alternately, data could be sent directly from Data Storage (or Data Acquisition) module to the Transceiver module to be delivered to another node over a wireless link.

Figure 10:
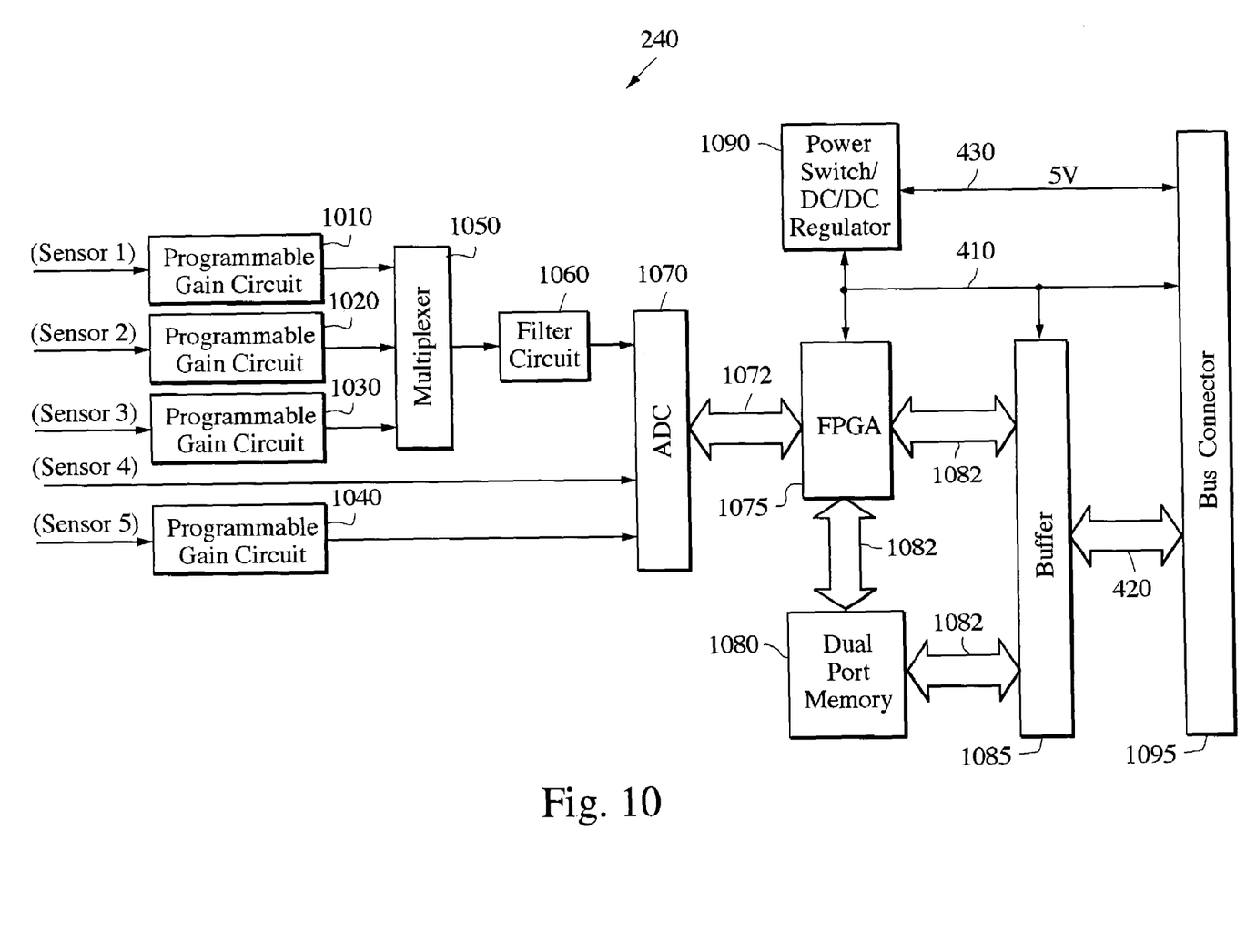
FIG. 10 is a block diagram of a data acquisition module.

Each module typically possesses a rather high degree of intelligence, implemented as a MC19 CPU core within the ASIC-implemented baseband controller 710 of the Transceiver module 210 (see FIG. 7) or an FPGA-based logic 1075 of the Data Acquisition module 240 (see FIG. 10). Transceiver module 210 can perform its radio-associated communication functions (including message auto-receive, Tx power adjustment, data pre/post processing and buffering). At the same time, the module can "signal" to the CPU module various events, such as "packet received" or "error, attention required" over signal bus 410 or deliver received packets and accept the packets to be sent over high-capacity bus 420. Using signal bus 410 allows Transceiver module 210 to "wake up" (turn on the power) CPU module 230, if the CPU module is in power-saving mode and high-capacity bus 420 is turned off. The Data Acquisition module can autonomously perform multiple samples of data, buffer it in the module's local memory 1080, run data processing algorithms (such as smoothing, FFT, or statistical processing). Data Acquisition module is capable of "self-configuring", such as gain change based on the input signal level and multiple input channel selection. After a completion of the data sampling or processing, the Data Acquisition module can send a notification to CPU module over signal bus 410 and upload the data over high-capacity bus 420.

Wins Modules

In some cases, power supply module 220 (see FIG. 8a) provides multiple reference voltages on power bus 260. Each module must be designed to run off one or more of the provided reference voltages. This places unnecessary limitations on the modules. Alternately, the power supply module 220 (as shown in FIG. 8b) can supply a single reference voltage on power bus 260. In this case, each module includes at least one internal DC/DC voltage transformer 610 as shown in FIG. 6 to step the voltage up or down to the level(s) required by the module. This may increase the complexity and cost of an individual module but improves overall system flexibility and cost effectiveness.

Transceiver Module

Figure 7:
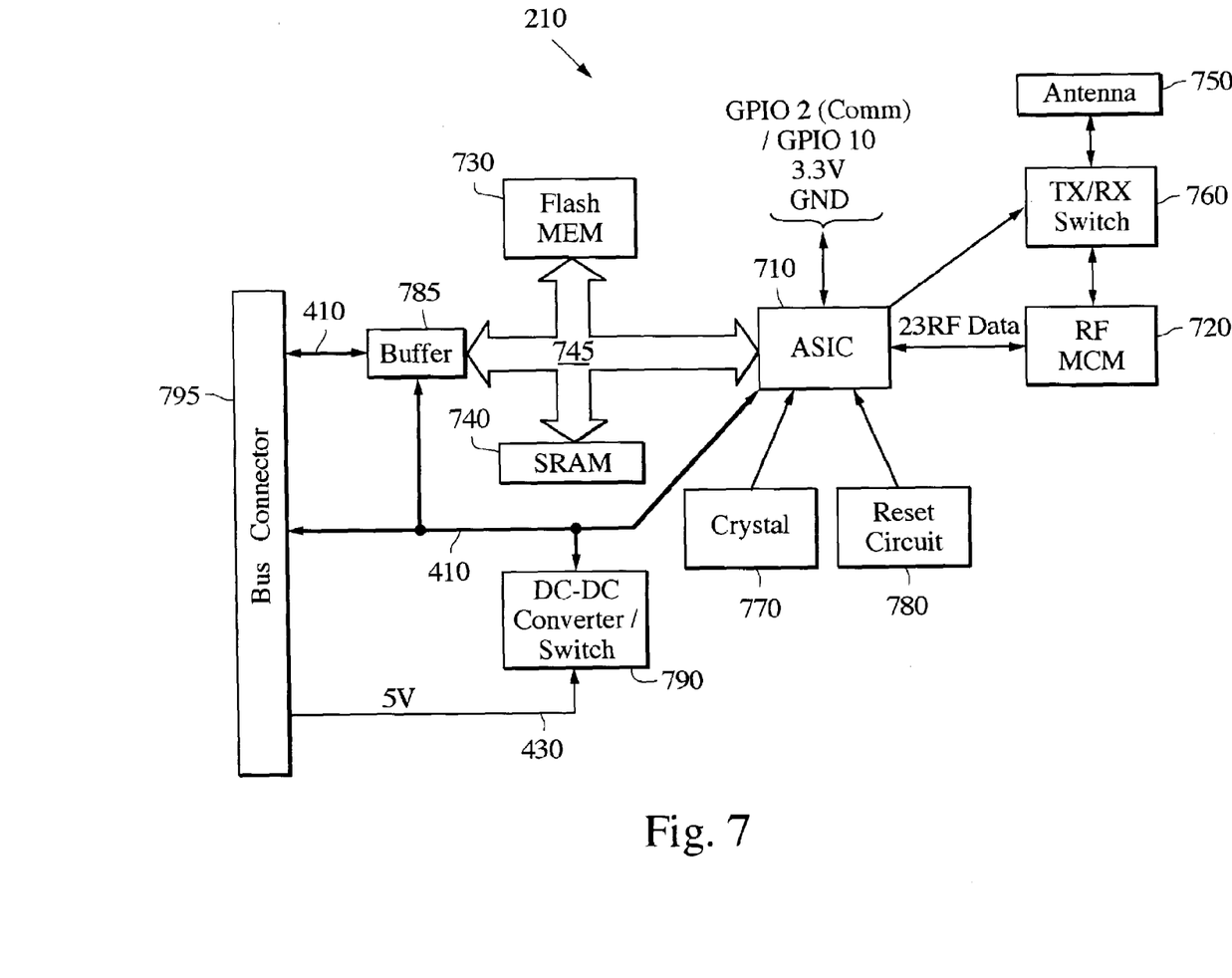
FIG. 7 is a block diagram of a transceiver module.

FIG. 7 is a high-level block diagram of transceiver module 210, in accordance with the present invention. Transceiver module 210 includes an application specific integrated circuit (ASIC) 710, a RF multichip module (MCM) 720, a flash memory (flash MEM) 730, a static random access memory (SRAM) 740, an antenna 750, a transmit/receive (TX/RX) switch 760, a crystal 770, a reset circuit 780, a buffer 785, a DC/DC converter and power switch 790 and a bus connector 795 arranged as shown in FIG. 7. All interconnections are electrical in nature.

Transceiver module 210 sends and receives instructions and data from the dual bus via bus connector 795 and buffer 785. Instructions are directed to ASIC 710 and data is directed to Flash MEM 730 and SRAM 740 via buffer 785. DC/DC converter and power switch 790 steps the voltage provided by the power bus up or down to power the module. In response to instructions either provided via the signal bus or by ASIC 710, power switch 790 can power down some or all of the module components or wake up the module.

The communications link is provided by the combination of ASIC 710 and RF MCM 720, which represent any standard wireless communication chipset, such as the Conexant RDSSS9M device set that implements a 900 megahertz (MHz) spread spectrum RF communication link that operates in normal or sleep mode.

Using the example of the Conexant RDSSS9M device set, integrated in ASIC 710 are a direct sequence spread spectrum (DSSS) baseband modem and a controller, and a front-end that includes a frequency synthesizer, mixers, and amplifiers. The baseband modem provides all modulation, encoding, spreading, scrambling, time division duplexing (TDD) control, automatic gain control (AGC), automatic frequency control (AFC), decoding, and timing required for a DSSS system. The controller has an embedded 65C02 microcontroller that performs all control and monitoring functions required for direct sequence spread-spectrum communications as well as data exchange with CPU module 230. Transceiver module 210 operates on one of 40 channels in the industrial, scientific, medical (ISM) frequency band, selectable by the controller. The ISM frequency band is the industrial, scientific, medical frequency band (902–928 MHz) that is available around in the United States for unlicensed applications, generally using low power and operating over short distances.

The RF portion of transceiver module 210 is packaged in RF MCM 720. Continuing with the example of the Conexant RDSSS9M device set, RF MCM 720 includes a Conexant RF105 and RF106 device. The Conexant RF105 is a fully integrated 900 MHz ISM band transceiver device that provides transmit, receive, and frequency synthesis functions for digital spread spectrum systems. The Conexant RF106 is a class AB RF power amplifier for 900 MHz ISM band applications.

Transceiver module 210 has 32 Kb of SRAM memory (i.e., SRAM 740) and 1024 Kb of bootable FLASH memory (i.e., flash memory 730) that is used for program (i.e., executable code) and data storage via 16 address and 8 data lines 745, and controls from ASIC 710. SRAM 740 is any standard SRAM, such as the NanoAmp Solutions, Inc., 32k×8 ES62UL256-45TC SRAM device having 45 ns access time. Flash MEM 730 is any standard non-volatile read/write flash memory, such as the Advanced Micro Devices, Inc. 1024k×1 AM29DL800BB70RWB device having 70 ns access time.

RF MCM 720 interfaces with antenna 750 via TX/RX switch 760. TX/RX switch 760 switches the antenna connection to either the radio transmitter or radio receiver depending on whether transceiver module 210 is transmitting or receiving. TX/RX switch 760 is formed using a standard cascade of transistors, such as MMDT2222A and MMBT3906 transistors.

Antenna 750 is an omni-directional 913 MHz antenna, such as the 83100 "rubber ducky" antenna available from Microhard Systems.

Crystal 770 is a crystal oscillator that generates the main clock feeding ASIC 710. A typical clock frequency is 9.6 MHz. Crystal 770 is, for example, a surface mount temperature compensated crystal oscillator, such as the ACT381T manufactured by Advanced Crystal Technology.

Reset circuit 780 monitors power-supply and battery functions in sensing station 120 and generates a reset to ASIC 710 during power-up, power-down, and brownout conditions. Reset circuit 780 is, for example, a Maxim MAX708 microprocessor supervisory device. The MAX708 device generates a reset pulse to ASIC 710 when the unregulated input supply voltage drops below 4.40 V. The MAX708 device provides four functions:

1) A reset output during power-up, power-down, and brownout conditions.
2) An independent power monitoring output reduces the power consumption if it has not been toggled within 1.6 seconds.
3) A 1.25 V threshold detector for power-fail warning, low-battery detection, or for monitoring a power supply other than +5 V.
4) An active-low manual-reset input.

The overall specifications of transceiver module 210 are shown in Table 1 below.

TABLE 1

| Transceiver module specifications | |
|---|---|
| Data Rate | 100 Kb/s |
| Power Supply | 3.3 V |
| Power Dissipation | Maximum < 750 mW |
| | Typical < 350 mW |
| Modes | Sleep current < 200 μA |
| | Idle power < 15 mW |
| RF Power | Programmable |
| Low | 1 mW |
| Medium | 10 mW |
| High | 100 mW |
| Range | up to 100 meters (at High power) |

Transceiver module 210 is capable of transmitting at several different power levels (i.e., up to 20). This is helpful to allow any given sensor station 120 to establish its neighborhood by transmitting messages at different power levels and waiting for responses from neighboring sensor stations 120, thereby determining how close or far away each neighboring sensor station 120 is located. For example, any neighboring sensor station 120 that responds to a low power RF signal is located only a short distance away, whereas a neighboring sensor station 120 that responds only to a high power RF signal indicates that it is located a further distance away. Furthermore, because transceiver module 210 is capable of transmitting at several different power levels, this feature helps with power conservation and aids the overall power management of wireless network system 100.

Power Supply Module

FIGS. 8a and 8b are high-level block diagrams of power supply module 220 that provide multiple reference voltages and a single voltage reference respectively. In the former case, each module must be designed to run off one of the provided reference voltages. In the later case, each module includes an internal voltage transformer (see FIG. 6) to step the voltage up or down to the level required by the module. For example a +5V bus might be stepped down to provide a 1.5V and 3.3V references to the CPU module, a 3.3V reference for the transceiver module and a 2.5V reference for the data acquisition module.

As shown in FIG. 8a, power supply module 220 includes a first battery 810, a second battery 820, a source of external power 830, a DC-DC converter 840, a linear regulator 850, and a DC-DC converter 860, arranged as shown in FIG. 8a. All interconnections are electrical in nature.

Power supply module 220 operates from one of several possible unregulated DC power sources, such as two standard 9 V batteries connected in parallel (i.e., batteries 810 and 820) or an external 4 to 15 volt supply (i.e., external power 830), such as a standard 12 V car battery. Alternatively, power supply module 220 operates from three standard 1.5 V AA size batteries connected in series.

The power source (i.e., batteries 810 and 820 or external power 830) provides an input voltage to DC-DC converters 840 and 860. DC-DC converter 840 converts the unregulated 4 to 15 V DC input to a 3.3 V DC regulated output (Output 1). DC-DC converter 840 is a step-down DC-to-DC converter with a preset output of 3.3 V, such as the Maxim MAX1626ESA device. Furthermore, the 3.3 V (i.e., Output 1) from DC-DC converter 840 feeds linear regulator 850, which produces a 3.0 V regulated output (Output 2). Linear regulator 850 is a linear voltage regulator with adjustable output, such as the Maxim MAX604CSA device. Linear regulator 850 has shutdown mode, +3.0 V Shutdown, driven externally via GPIO. +3.0 V Shutdown turns off all circuitry and puts the regulator in a 2 µA "off" mode.

Finally, DC-DC converter 860 converts the unregulated 4 to 15 V DC input to a 1.5 V DC regulated output (Output 3). DC converter 860 is a high efficiency step-down DC-to-DC converter with adjustable output, such as the Maxim MAX887HESA device. DC-DC converter 860 has shutdown mode, +1.5 V Shutdown, driven externally via GPIO. In shutdown, DC-DC converter 860 turns off and the output falls to zero volts.

Power supply module 220 has two modes of operation. The first mode, "idle mode", provides high efficiency while supplying low current. The second mode, "normal mode", provides efficient generation of larger currents. The transition between these two modes is automatic and occurs when a power draw is low current or high current. Appropriate capacitors are used to allow the system to draw peak current for limited periods of time.

The overall specifications of power supply module 220 are shown in Table 2 below.

TABLE 2

Power supply module specifications

| | Min | Max |
|---|---|---|
| Input | 3.5 V | 15 V |
| Output 1 | 3.2 V | 3.5 V |
| Output 3 | 1.4 V | 1.6 V |
| Line Regulation | | 0.05%/V |
| Load Regulation | | 2% |
| Output 1: 3.3 V | | |
| Current | 15 mA | 300 mA |
| Current - idle mode | 0.05 mA | 15 mA |
| Ripple | | 10 mV |
| Output 2: 3.0 V | | |
| Current | 0 mA | 20 mA |
| Ripple | | 10 mV |
| Output 3: 1.5 V | | |
| Current | 0 mA | 160 mA |
| Ripple | | 30 mV |

In summary, power supply module 220 delivers regulated DC outputs of 3.3 V, 3.0 V, and 1.5 V from the unregulated DC input voltage of 4 to 15 volts to transceiver module 210, CPU module 230, and data acquisition module 240. Power supply module 220 also includes a low-battery detector bit (logic level, goes high when battery goes low) and an over-current indication.

As shown in FIG. 8b, the power source (i.e., battery 865 or external power 870) provides an input voltage to DC-DC converter 875, which converts the unregulated 4 to 15 V DC input to a +5 V DC regulated output, for example. A battery charger 880 charges battery 865 and a battery monitor 885 provides battery status to the CPU module via a digital interface.

CPU Module

Figure 9:
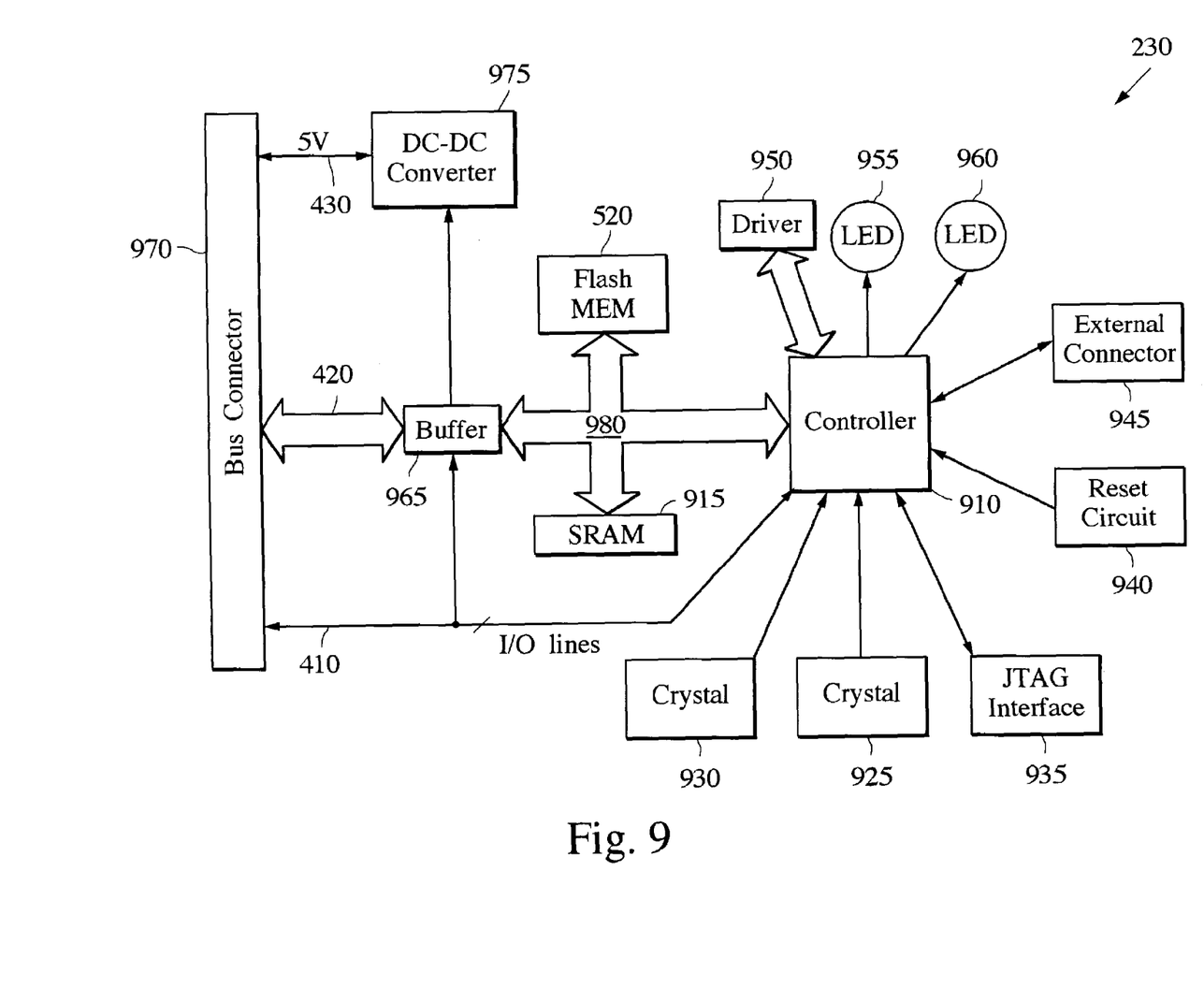
FIG. 9 is a block diagram of a CPU module.

FIG. 9 is a high-level block diagram of CPU module 230, in accordance with the present invention. CPU module 230 includes a controller 910, an SRAM 915, a Flash memory 920, a crystal 925, a crystal 930, a joint test action group (JTAG) interface 935, a reset circuit 940, an external connector 945, a driver 950, a light emitting diode (LED) 955, an LED 960, a buffer 965, a bus connector 970 and a DC/DC converter 975 arranged as shown in FIG. 9. All interconnections are electrical in nature.

CPU module 230 sends and receives instructions and data from the dual bus via bus connector 970 and buffer 965. Instructions are directed to controller 510 and data is directed to Flash memory 920 and SRAM 915 via buffer 965. DC/DC converter 975 steps the voltage provided by the power bus up or down to power the module.

Controller 910 is a general-purpose, 32-bit RISC microprocessor, such as the SA1100 integrated microcontroller that is a member of the StrongARM family of microprocessors. The SA1100 is a general-purpose, 32-bit RISC microprocessor with a 16 Kb instruction cache, an 8 Kb write-back data cache, a mini-cache, a write buffer, a read buffer, a memory management unit (MMU), a liquid crystal display (LCD) controller, personal computer memory card international association (PCMCIA) support, timers (including a real time clock), serial I/O, 28 general purpose I/Os, an interrupt controller, a direct memory access (DMA) controller, ten serial controllers, and power management control combined in a single chip. Controller 910 operates at 1.5 V with 3.3 V I/Os. Typical power consumption is estimated at up to 200 mW. When powered down in sleep mode, a maximum of 50 μA is consumed, conserving battery life. The SA1100 (i.e., controller 910) provides sophisticated power-management functionality and provides further power savings and integration by including oscillators and phase-lock-loop circuitry (PLLs) on-chip.

The overall specifications of controller 910 are shown in Table 3 below.

TABLE 3

Controller specifications

| | SA1100 133 |
|---|---|
| Clock | 133 MHz |
| Performance | 150 MIPS |
| Core Power Supply | 1.5 V |
| I/O Power Supply | 3.3 V |
| Power Dissipation | Maximum < 300 mW |
| | Typical < 200 mW |
| Modes | Sleep current = <50 μA |
| | Idle power = <40 mW |
| Packaging | 208-pin TQFP |
| Transistor Count | 2.5 million |

CPU module 230 has 1 MB of SRAM memory (i.e., SRAM 915) and 4 MB of bootable FLASH memory (i.e., flash MEM 920) that is used for program (i.e., executable code) and data storage via address and data lines 980, and controls lines between bus connector 970 and controller 910. SRAM 915 is any standard SRAM, such as the NanoAmp 64k×16 EM128C16 SRAM device. Flash MEM 920 is any standard non-volatile read/write flash memory, such as the Intel 1024k×4 DT28F160F device.

Crystal 925 is a crystal oscillator that generates a clock that feeds controller 910. Controller 910 uses this oscillator frequency for general-purpose 32-bit OS timers. A typical clock frequency for crystal 925 is 3.6864 MHz. Crystal 925 is, for example, a miniature surface mount temperature compensated crystal oscillator, such as the Fox Electronics FC series crystals.

Crystal 930 is a crystal oscillator that generates a real time clock that feeds controller 910. A typical clock frequency for crystal 930 is 32.768 KHz. Crystal 930 is, for example, a miniature surface mount temperature compensated crystal oscillator, such as the Fox Electronics FST327 crystal.

JTAG interface 935 provides physical access to controller 910 for testing using the IEEE 1149.1 boundary-scan standard that has been adopted industry-wide.

Reset circuit 940 monitors power-supply and battery functions in sensing station 120 and generates a reset to controller 910 during power-up, power-down, and brownout conditions. Reset circuit 940 is, for example, a Maxim MAX706 microprocessor supervisory device. The MAX706 device generates a reset pulse to controller 910 when the unregulated input supply voltage drops below 4.40 V. The MAX706 device provides four functions:
1. A reset output during power-up, power-down, and brownout conditions.
2. An independent power monitoring output reduces the power consumption if it has not been toggled within 1.6 seconds.
3. A 1.25 V threshold detector for power-fail warning, low-battery detection, or for monitoring a power supply other than +5 V.
4. An active-low manual-reset input.

External access to and from controller 910 is provided via external connector 945 that facilitates full RS-232 serial interface and 7 GPIO connections. External connector 945 is a standard 4-pin connector, such as a Brad Harrison Nanochange 4R4P00A27C300 connector.

Driver 950 is a standard transceiver that provides the serial I/O interface between CPU module 230 and transceiver module 210. Driver 950 also provides the serial I/O interface between CPU module 230 and computer module 110 of wireless network system 100 (FIG. 1) via a RS-232 cable. Driver 950 is, for example, a Maxim MAX3243 transceiver device with auto shutdown. When the MAX3243 does not sense a valid signal level on receiver inputs, the on-board power supply and drivers shut down. The system turns on again when a valid level is applied to any RS-232 receiver input.

LEDs 955 and 960 are standard light emitting diodes, such as a Panasonic LNJ310M6URA surface mount LED. The functions of LEDs 955 and 960 are programmed to indicate various activities, such the internal state of the processor, based on their blinking pattern. LEDs 955 and 960 are particularly useful for debugging or system status monitoring purposes.

In summary, CPU module 230 provides control of all software tasking for wireless node 130. CPU module 230 also supports peripheral hardware control and provides computational power for the calibration of sensor 140, for signal processing, and for diagnostic algorithms that run as an application on wireless node 130.

Data Acquisition Module

FIG. 10 is a high-level block diagram of data acquisition module 240, in accordance with the present invention. Data acquisition module 240 includes a programmable gain circuit 1010, a programmable gain circuit 1020, a programmable gain circuit 1030, a programmable gain circuit 1040, a multiplexer 1050, a filter circuit 1060, and an analog-to-digital converter (ADC) 1070, a FPGA 1075, a dual-port memory 1080, a buffer 1085, a DC/DC Converter and power switch 1090 and a bus connector 1095 arranged as shown in FIG. 10. All interconnections are electrical in nature.

Externally connected sensors 1, 2, and 3 feed programmable gain circuits 1010, 1020, and 1030, respectively. Programmable gain circuits 1010, 1020, and 1030 of these AC coupled sensor inputs are designed for accelerometers and are separately gain programmable. A gain of 1, 2, 5, 10, or 20 is selected using a CMOS analog multiplexer, such as an Analog Devices ADG704BRM, feeding an operational amplifier (op amp), such as a Maxim MAX4332ESA op amp. Each output of programmable gain circuits 1010, 1020, and 1030 feeds a first, second, and third input of multiplexer 1050, respectively.

Multiplexer 1050 is a CMOS analog 4-to-1 multiplexer, such as the Analog Devices ADG704BRM that provides low power dissipation yet gives high switching speed, low on-resistance, low leakage currents, and high bandwidths. The output of multiplexer 1050 feeds filter circuit 1060.

Filter circuit 1060 is a 6-pole low pass filter with a 20 KHz cutoff frequency implemented using conventional analog devices. The output of filter circuit 1060 feeds a first input of ADC 1070.

An externally connected sensor 4 directly feeds, without gain, a second input of ADC 1070. Sensor 4 is, for example, a temperature sensor.

Programmable gain circuit 1040 feeds a third input of ADC 1070. An externally connected sensor 5 feeds programmable gain circuit 1040. Programmable gain circuit 1040 of this AC coupled sensor 5 input is designed for pressure sensors and is gain programmable. A gain of 10, 20, 30, 40, or 50 is selected using a CMOS analog multiplexer, such as the Analog Devices ADG704BRM, feeding an operational amplifier, such as the Maxim MAX4332ESA.

ADC 1070 is a 12-bit, 4-channel parallel output sampling analog-to-digital converter, such as a Burr-Brown Corporation ADS7842. ADC 1070 draws only 2 mW at a 200 KHz sampling rate and uses a successive approximation register for analog-to-digital conversion. A full 12-bit wide parallel output of ADC 1070 is provided from data acquisition module 240 to CPU module 230.

In summary, three sensor inputs are multiplexed (i.e., multiplexer 1050) through a common 6-pole low pass filter (i.e., filter circuit 1060) with a 20 KHz cutoff frequency to one channel of ADC 1070. The gains of these AC coupled sensor inputs (i.e., programmable gain circuits 1010, 1020, and 1030) are designed for accelerometers and are separately gain programmable. A fourth sensor input is fed directly to one of the ADC 1070 channels. Finally, a fifth sensor input (i.e., programmable gain circuit 1040) is gain programmable and feeds one of the ADC 1070 channels, leaving one ADC 1070 channel unused.

In response to instructions received via signal bus 410, ADC 1070 passes the digital signals over data lines 1072 to FPGA 1075, which processes the digital signals and sends them on address and data lines 1082 via buffer 1085 and bus connector 1095 on high-capacity bus 420 to the CPU or other module. The amount and nature of any processing will depend upon overall node architecture, power management and the current task. Dual-port memory 1080 is used to receive and store coefficients or other data via address and data lines 1081 needed by FPGA 1075 to process the data or to store processed data.

DC/DC converter and power switch 1090 steps the voltage provided by power bus 430 up or down to power the module. In response to instructions either provided via the signal bus or by the data acquisition module itself, power switch 1090 can power down some or all of the module components or wake up the module.

Modular Assembly

Figure 11A:
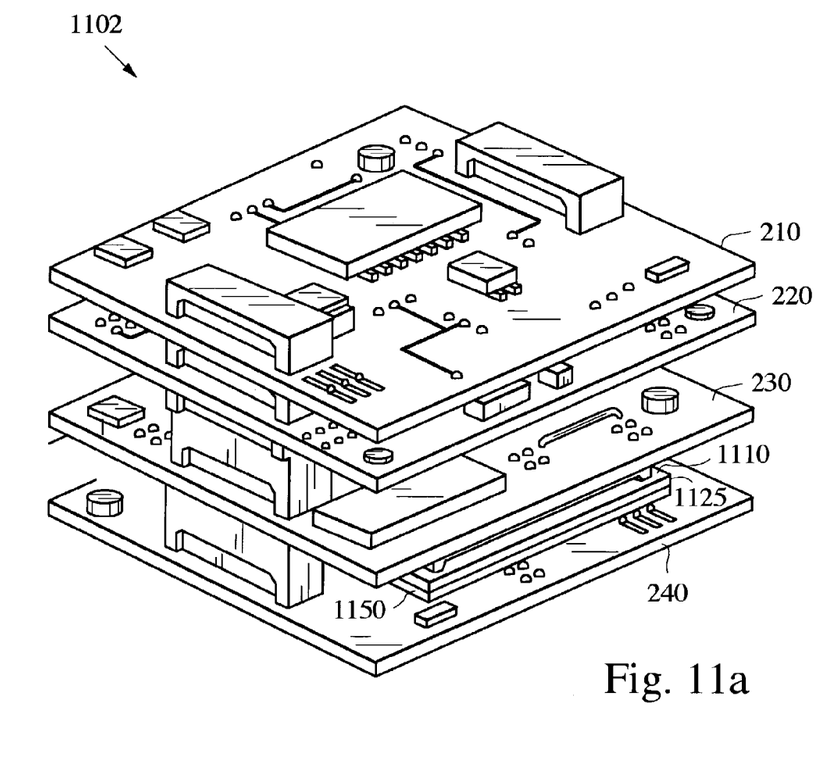
FIGS. 11a and 11b are perspective and side views of a stacked implementation of the modular WINS node.
Figure 11B:
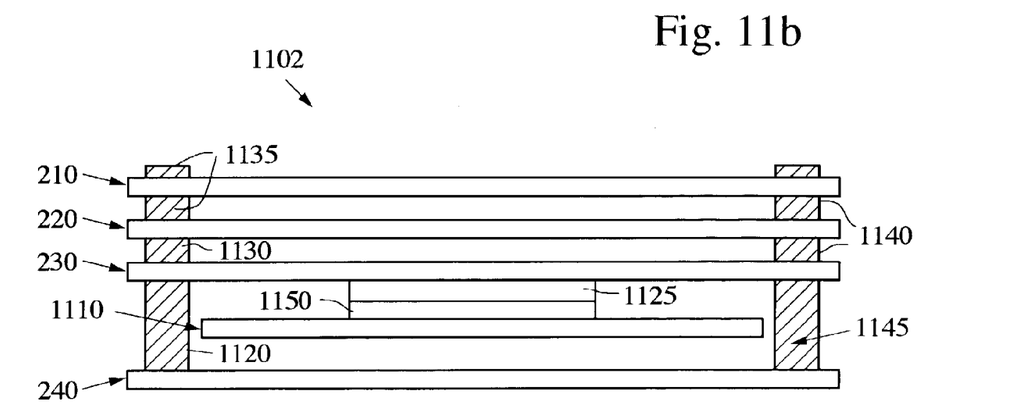

FIGS. 11a and 11b are perspective and side views of a implementation of the modular WINS node. Each implementation has at least one open port, e.g. connector, for receiving an additional module that plugs directly into the bus. In the stacked configuration, additional modules are "stacked" on top of the open connector on last module. The number of modules is limited by package size and the ability of the bus to maintain the voltage and current levels. As shown in FIGS. 11a and 11b, a stacked module assembly 1102 further includes transceiver module 210, power supply module 220, CPU module 230, data acquisition module 240, and a memory board 1110. In this packaging example, the memory functions of CPU module 230 as shown in FIG. 9 have been implemented on their own separate printed circuit board (PCB), i.e., memory board 1110. More specifically, board assembly 1102 separates SRAM 915 and flash MEM 920 of FIG. 9 onto memory board 1110, which is integrated into board assembly 1102 via 80-pin connectors 1125 and 1150 connecting memory board 1110 to CPU module 230.

Transceiver module 210, power supply module 220, CPU module 230, data acquisition module 240, and memory board 1110 are typically implemented with a two-sided multi-layer 5.5 cm square PCB design. Surface mount components with a component thickness of less than 10 mm are typically employed.

The boards of board assembly 1102 are assembled front to back using an assortment of connectors. The boards of board assembly 1102 are arranged in the following order as shown in FIG. 11b: transceiver module 210, power supply module 220, CPU module 230, memory board 1110, then data acquisition module 240.

CPU module 230 has two 60-pin bus connectors 1120, such as AMP connector AMP-SMT60, and one 80-pin connector 1125, such as AMP connector AMP-SMT80, mounted on one side of the board and two 40-pin bus connectors 1130, such as AMP connector AMP-SMT40, mounted on the other side.

Transceiver module 210 has four 40-pin bus connectors 1135, such as AMP connector AMP-SMT40. Two of the connectors are mounted on the front of the PCB and the remaining two are mounted on the back of the PCB.

Power supply module 220 has four 40-pin bus connectors 1140, such as AMP connector AMP-SMT40. Two of the connectors are mounted on the front of the PCB and the remaining two are mounted on the back of the PCB. Power supply module 220 also includes the appropriate connector for an external power supply and wired connection for internal batteries. Power supply module 220 is shielded to protect the other nearby boards from electrical interference.

Data acquisition module 240 has two 60-pin bus connectors 1145, such as AMP connector AMP-SMT60, mounted on one side only of its PCB. These two 60-pin bus connectors allow parallel data transfer between data acquisition module 240 and CPU module 230 for address, data, control, and power distribution lines.

Memory board 1110 has one 80-pin connector 1150, such as AMP connector AMP-8-353159-0. It is a daughter board to CPU module 230 and mounts only to CPU module 230 through its 80-pin connector 1125. The daughter board is a small form factor so that the CPU module 230-to-memory board 1110 sandwich is treated as one board in terms of connectivity to the main bus.

Power Management

The modularity provided by the bus architecture and the further flexibility offered by the "dual bus" offer power savings advantages not supported by hard-wired architectures. These advantages are realized both within a module and between modules. Effective power management is critical in any wireless sensing station.

The dual bus architecture allows modules to powered-down when not and use and turned on as needed. For example, the data acquisition module is powered-down most of the time and turned on only when data collection is required. A node enters the data acquisition mode by sending commands via the signal bus to power up the ADC on the data acquisition module, waits for the module to stabilize the circuitry and powers up the module bus buffer. The CPU module requests data sampling by the data acquisition module via the signal bus and retrieves the measured data over the high-capacity bus. The CPU module then sends commands via the signal bus to power down the module bus buffer and turn off the data acquisition module analog and digital power.

Consider three separate power saving states of the Data Acquisition module. In the first state, all of the hardware; FPGA, memory and ADC, are initially turned off. The high-capacity data bus is inactive and decouples both memory and the FPGA from the rest of the node. This state minimizes power consumption. When the module is needed, a command is sent via the signal bus to the power switch to "wake up" the module. In a second state, the data acquisition module is operated in a low-bandwidth sampling mode in which only the ADC is on. Data is sent via the signal bus and the high-capacity bus remains inactive. In a third state, data has been acquired, processed and stored in memory. Both the FPGA and ADC are powered down and the memory remains on to store the data.

Consider the power management capabilities supported by the dual bus architectures in the following interactions between modules. In the first case, the node needs to access the raw sensor data without local processing. Rather than having to suffer the power penalty associated with powering up the Data Acquisition module's memory and FPGA and activating the high-capacity bus, the CPU module uses the signal bus to access the data. In the second case, the node needs to gather and process sensor data. Even though the Data Acquisition module may be fully powered up, it can still be decoupled from the high-capacity bus, which allows the CPU module to be powered down. When data acquisition is complete, the FPGA and ADC are turn off and the processed data is stored in memory. The CPU module wakes up and reads the stored data out of memory using the high-capacity bus.

In distributed sensing networks, WINS nodes may be required to relay or retransmit network information without providing any data collection or processing. The current architecture allows the node to shutdown all power consuming functions except the transceiver module to relay information. A node enters the relay mode by sending commands to shut-down the bus buffers in both the CPU and data acquisition modules, power-down the data acquisition module, and put the CPU module in the sleep state. The node exits the relay mode by sending commands to wake-up the CPU module, which can occur as a time-out event or in response to a command from the transceiver module via the signal bus, power up the data acquisition module if needed, power up the corresponding bus buffers and initiate inter-module data communication via the data bus.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A wireless sensing station, comprising:
    a dual-bus, comprising,
        a signal bus for communicating instructions and low bandwidth data, and
        a high-capacity bus for communicating high bandwidth data,
    a power supply module that supplies at least one reference voltage at a plurality of current levels,
    a power bus for distributing the reference voltage,
    a sensor that provides an output indicative of a sensed condition,
    a data acquisition module having a plurality of components coupled to receive the sensor output and configured to produce a digital output based upon the sensor condition, said module connected to the dual-bus and power bus and configured to (a) send and receive instructions and low bandwidth data over the signal bus at a low current level drawn from the power bus and (b) selectively enable module components that draw higher current levels from the power bus to acquire and send high bandwidth data over the high-capacity bus,
    a CPU module connected to the dual-bus and power bus to send instructions to said data acquisition module and to receive and evaluate its digital output, and
    a transceiver module connected to the dual-bus and power bus that receives data and instructions for programming said CPU module and transmits information about the sensed condition.

2. The wireless sensing station of claim 1, wherein the power bus distributes a single reference voltage to the modules.

3. The wireless sensing station of claim 2, wherein at least one of said modules comprises a DC/DC converter to step the reference voltage to an internal module voltage.

4. The wireless sensing station of claim 1, wherein the power bus sources electrical current at at least two levels for each said reference voltage.

5. The wireless sensing station of claim 1, wherein the data acquisition module comprises a digital signal processor that processes the digital output.

6. The wireless sensing station of claim 1, wherein the data acquisition module comprises a power switch that is enabled via the signal bus.

7. The wireless sensing station of claim 1, wherein the signal bus is continuously enabled to maintain a minimum level of communications and data transfer capability and the high-capacity bus is selectively enabled to transfer high bandwidth data.

8. The wireless sensing station of claim 7, wherein the signal bus comprises 2–6 address lines and 2–6 control lines that support 2–4 bit data and the high-capacity bus comprises 12–20 address lines and 20–28 control lines that support 16–64 bit data.

9. A node, comprising:
    a dual-bus, comprising,
        a signal bus for communicating instructions and low bandwidth data, and
        a high-capacity bus for communicating high bandwidth data,
    a CPU module structurally connected to the dual-bus to issue control instructions over the signal bus, and
    at least one module structurally connected to the dual-bus, said module comprising memory for storing data and at least one I/O device for acquiring data.

10. The wireless sensing station of claim 9, further comprising:
    a plurality of connectors for connecting the respective modules to the dual-bus, and
    at least one open connector configured for connecting at least one additional module to said dual-bus.

11. The node of claim 9, wherein the signal bus is continuously enabled to maintain a minimum level of communications and data transfer capability and the high-capacity bus is selectively enabled to transfer high bandwidth data.

12. The node of claim 11, wherein the signal bus comprises 2–6 address lines and 2–6 control lines that support 2–4 bit data and the high-capacity bus comprises 12–20 address lines and 20–28 control lines that support 16–64 bit data.

13. The node of claim 9, wherein said module further comprises a power switch configured to receive a control instruction from the CPU module via the signal bus to switch between low and higher power consuming modes.

14. The node of claim 9, further comprising a power bus for distributing at least one reference voltage to the modules.

15. The node of claim 14, wherein the power bus distributes a single reference voltage to the modules, said modules comprising a DC/DC converter to step the reference voltage to an internal module voltage.

16. The node of claim 9, further comprising a transceiver module that sends and receives data to and from the node.

17. A wireless sensing station, comprising:
- a sensor which provides an output indicative of a sensed condition,
- a data acquisition module coupled to receive the sensor output and configured to produce a digital output based upon said sensor condition,
- a CPU module coupled to said data acquisition module to evaluate its digital output,
- a transceiver module that receives data and instructions for programming said CPU module and transmits information about the sensed condition, and
- a dual-bus, comprising,
    - a signal bus that is continuously enabled to maintain a minimum level of instructions and low bandwidth data transfer capability between the modules, and
    - a high-capacity bus that is selectively enabled to transfer high bandwidth data between the modules,
- wherein said data acquisition and transceiver modules further comprise a power switch that selectively enables the respective modules to switch between a low power consuming mode in which the signal bus is used exclusively and a higher power consuming mode in which the high-capacity bus is enabled to transfer high bandwidth data.

18. The wireless sensing station of claim 17, wherein said power switch is configured to receive a control instruction from the CPU module via the signal bus to switch between said low and higher power consuming modes.

19. The wireless sensing station of claim 17, wherein the signal bus comprises 2–6 address lines and 2–6 control lines that support 2–4 bit data and the high-capacity bus comprises 12–20 address lines and 20–28 control lines that support 16–64 bit data.

20. The wireless sensing station of claim 17, further comprising:
- a power bus; and
- a power supply module that distributes a single reference voltage via the power bus to the modules, said CPU, data acquisition and transceiver modules further comprising a DC/DC converter to step the reference voltage to an internal module voltage.

21. The wireless sensing station of claim 17, wherein the dual-bus is provided by a plurality of bus connectors that interconnect the modules.

22. The wireless sensing station of claim 21, wherein at least one bus connector is unused for connecting at least one additional module to said bus.

23. A wireless node, comprising:
- a dual-bus, comprising,
    - a signal bus for communicating instructions and low bandwidth data, and
    - a high-capacity bus for communicating high bandwidth data,
- a power bus for distributing at least one reference voltage at a variable current level,
- a first module connected to the dual-bus and power bus to issue control instructions over the signal bus, and
- a second module connected to the dual-bus and power bus and comprising a plurality of components configured to acquire and transmit data, said module configured to ordinarily operate in a low power mode to receive control instructions from the first module over the signal bus and draw a low current level from the power bus and to selectively enable components to acquire and transmit high bandwidth data over the high-capacity bus and draw a higher current level from the power bus.

24. A node, comprising:
- a dual-bus, comprising,
    - a signal bus for communicating instructions and low bandwidth data, and
    - a high-capacity bus for communicating high bandwidth data, and
- a plurality of modules structurally connected to the dual-bus to transmit and receive instructions and data there between over the dual-bus.

25. The node of claim 24, wherein said plurality of modules comprises:
- a data acquisition module that acquires data on a sensed condition; and
- a transceiver module that transmits data about the sensed condition.

* * * * *